United States Patent
Wolff et al.

(10) Patent No.: US 12,554,785 B2
(45) Date of Patent: Feb. 17, 2026

(54) PERSONA MANAGEMENT

(71) Applicant: Perfecta Federal, LLC, Springfield, VA (US)

(72) Inventors: Daniel Wolff, Springfield, VA (US); George Zoulias, Springfield, VA (US)

(73) Assignee: Perfecta Federal, LLC, Springfield, VA (US)

( * ) Notice: Subject to any disclaimer, the term of this patent is extended or adjusted under 35 U.S.C. 154(b) by 0 days.

(21) Appl. No.: 18/228,627

(22) Filed: Jul. 31, 2023

(65) Prior Publication Data

US 2024/0273150 A1 Aug. 15, 2024

Related U.S. Application Data

(60) Provisional application No. 63/445,610, filed on Feb. 14, 2023.

(51) Int. Cl.
*G06F 16/335* (2019.01)
*G06F 16/14* (2019.01)
*G06F 16/9535* (2019.01)

(52) U.S. Cl.
CPC ........ *G06F 16/9535* (2019.01); *G06F 16/156* (2019.01); *G06F 16/337* (2019.01)

(58) Field of Classification Search
CPC .... G06F 16/337; G06F 16/437; G06F 16/637; G06F 16/9035; G06F 16/9535
See application file for complete search history.

(56) References Cited

U.S. PATENT DOCUMENTS

| | | | | |
|---|---|---|---|---|
| 10,425,350 | B1* | 9/2019 | Florissi | H04L 47/762 |
| 10,902,841 | B2* | 1/2021 | Liu | G10L 25/63 |
| 11,048,768 | B1* | 6/2021 | Kolbert | H04L 51/52 |
| 2003/0088573 | A1* | 5/2003 | Stickler | G06F 16/9535 |
| 2005/0131830 | A1* | 6/2005 | Juarez | G06F 16/9535 705/51 |
| 2009/0292814 | A1* | 11/2009 | Ting | G06Q 50/01 709/229 |
| 2010/0010944 | A1* | 1/2010 | Cheng | H04L 67/303 709/224 |
| 2012/0030210 | A1* | 2/2012 | Sankhla | G06F 16/248 707/E17.143 |
| 2015/0347542 | A1* | 12/2015 | Sullivan | G06F 9/5072 707/602 |

(Continued)

*Primary Examiner* — Robert W Beausoliel, Jr.
*Assistant Examiner* — Nirav K Khakhar
(74) *Attorney, Agent, or Firm* — Conley Rose, P.C.

(57) ABSTRACT

Methods, systems, and apparatus, including computer programs encoded on a computer storage medium, to manage a persona are disclosed. In one aspect, a method includes the actions of receiving, by a computing device, a request to export a persona. The actions further include, in response to receiving the request to export the persona, identifying, by the computing device, data associated with the persona. The actions further include selecting, by the computing device, a portion of the data associated with the persona. The actions further include generating, by the computing device, a persona export file using the portion of the data associated with the persona and not a remaining portion of the data associated with the persona. The actions further include providing, for output by the computing device, the persona export file.

20 Claims, 3 Drawing Sheets

(56) References Cited

U.S. PATENT DOCUMENTS

| | | | |
|---|---|---|---|
| 2016/0132608 A1* | 5/2016 | Rathod | H04W 4/21 |
| | | | 707/722 |
| 2018/0121333 A1* | 5/2018 | Richter | G06F 11/3676 |
| 2023/0057877 A1* | 2/2023 | DiMaria | H04M 3/5231 |
| 2023/0368310 A1* | 11/2023 | Dalton | G06Q 30/0269 |
| 2024/0143681 A1* | 5/2024 | Meyer | G06F 40/134 |
| 2024/0143930 A1* | 5/2024 | Brinton | G06F 16/90332 |

\* cited by examiner

PERSONA MANAGEMENT

CROSS-REFERENCE TO RELATED APPLICATION

This application claims the benefit of U.S. Application 63/445,610, filed Feb. 14, 2023, which is incorporated by reference.

TECHNICAL FIELD

This specification generally relates to managing personas, and, in more detail, exporting personas from one cloud computing instance to another cloud computing instance.

BACKGROUND

A persona may be a profile of a person and may include data related to that person's interactions with various computing systems and non-computer related systems. The persona may include demographic information of the person. The data related to the person's interactions with various computing systems may include the person's information creation and sharing network accounts, the devices used to access those accounts, and how the person uses those accounts to interact with other individuals.

SUMMARY

Creating a persona can be a time consuming and labor-intensive process. For a persona created in an instance of a persona management application, it can be difficult to move the persona from the original instance of the persona management application to the new instance of the persona management application. For example, moving the persona may involve creating the persona again, from scratch, in the new instance of the persona management application, which just adds to the time and labor involved in the persona creation process, in addition to using additional computing resources to essentially perform the same tasks a second time.

Accordingly, it would be helpful to create a process for exporting a persona from the original instance of the persona management application by generating a persona export file. That persona export file could then be imported into the new instance of the persona management application. To export the persona, the persona export tool should be able to identify the data to export. Data related to the persona may be spread across multiple databases and modules. Some of that data may be bound to the instance of the persona management application and may be difficult, or even impossible, to export. Once the persona export tool identifies the data to export, the persona export tool can generate the persona export file. That persona export file can then be imported into a new instance of the persona management application.

An innovative aspect of the subject matter described in this specification may be implemented in methods that include the actions of receiving, by a computing device, a request to export a persona; in response to receiving the request to export the persona, identifying, by the computing device, data associated with the persona; selecting, by the computing device, a portion of the data associated with the persona; generating, by the computing device, a persona export file using the portion of the data associated with the persona and not a remaining portion of the data associated with the persona; and providing, for output by the computing device, the persona export file.

These and other implementations can each optionally include one or more of the following features. The action of identifying the data associated with the persona includes identifying a persona virtual device that includes a virtual machine that allows a user to access the persona. The remaining portion of the data associated with the persona includes the persona virtual device. The action of identifying the data associated with the persona includes identifying elastic search logging records that are associated with the persona. The remaining portion of the data associated with the persona includes the elastic search logging records. The action of identifying the data associated with the persona includes identifying unified communications as a service (UCaaS) related information that is associated with the persona. The remaining portion of the data associated with the persona includes the UCaaS-related information.

The persona is located on a first cloud computing instance. The persona export file is configured to be loaded onto a second, different cloud computing instance. The action of identifying the data associated with the persona includes identifying data available on a digital asset management service that is associated with the persona. The portion of the data associated with the persona includes the data available on the digital asset management service that is associated with the persona. The action of generating the persona export file using the portion of the data associated with the persona and not a remaining portion of the data associated with the persona includes generating, using the data available on the digital asset management service that is associated with the persona, a digital asset management persona file in a data interchange format; and including the digital asset management persona file in the persona export file.

The action of identifying the data associated with the persona includes identifying data that is located on a back-end database of a first cloud computing instance where the persona is located. The portion of the data associated with the persona includes the data that is located on the back-end database of the first cloud computing instance where the persona is located. The action of generating the persona export file using the portion of the data associated with the persona and not a remaining portion of the data associated with the persona includes generating, using the data that is located on the back-end database of the first cloud computing instance where the persona is located, a back-end database persona file in the data interchange format; and including the back-end database persona file in the persona export file. The action of generating the persona export file using the portion of the data associated with the persona and not a remaining portion of the data associated with the persona includes generating a metadata file that includes data identifying content of the portion of the data associated with the persona; and including the metadata file in the persona export file.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. A persona can be exported between instances of a persona management application without manually recreating the persona. Data can be selected for exporting a persona instead of wasting computing resources exporting each item of data tangentially related to the persona.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
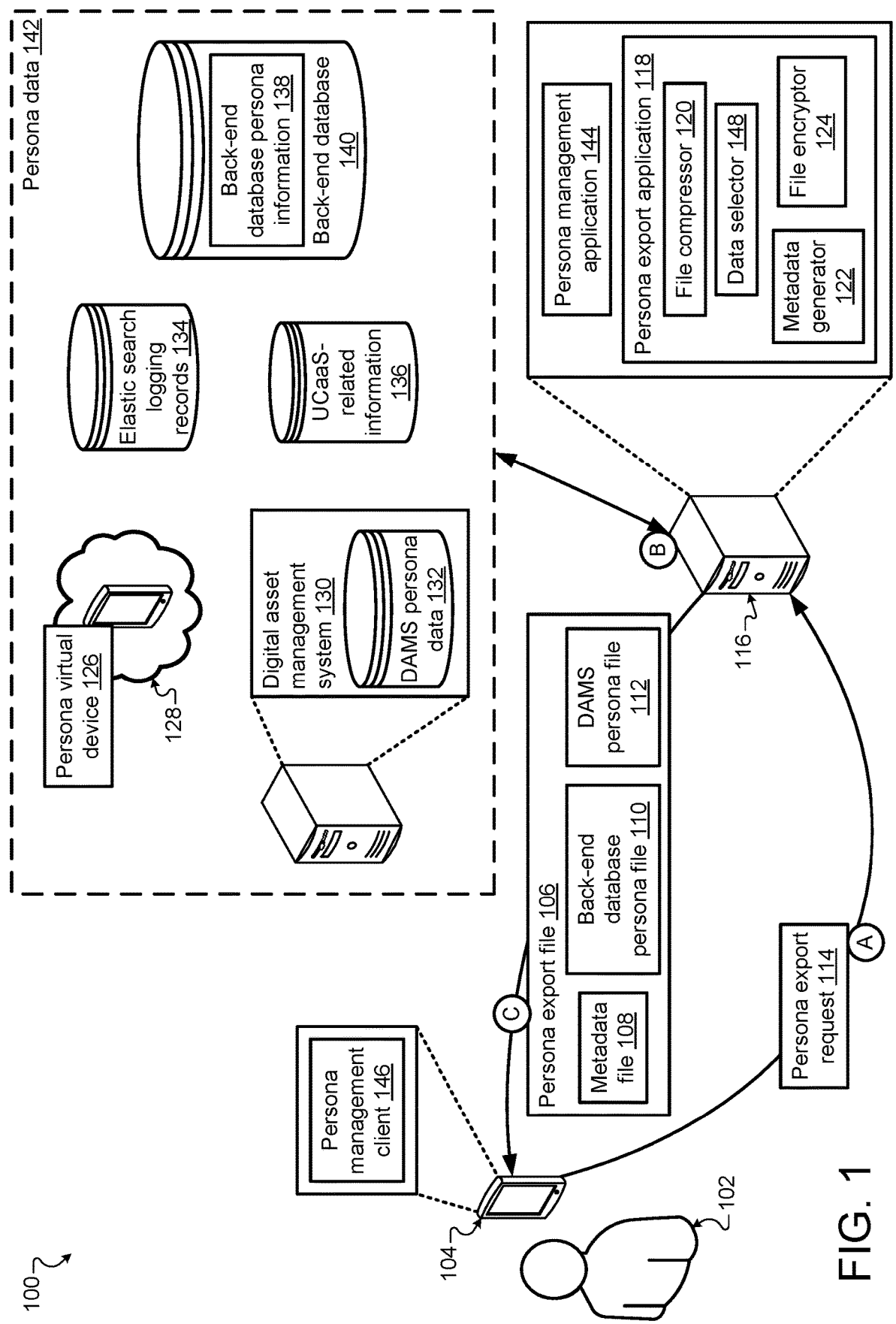
FIG. 1 illustrates an example system that is configured to export a persona.

FIG. 1 illustrates an example system 100 that is configured to export a persona. Briefly, and as described in more detail below, the user 102 may be interacting with a persona through the persona management application 144 of the server 116. The persona may exist in the instance of the persona management application 144, and the user 102 may wish to export the persona to another instance of the persona management application 144. In this case, the user 102 may submit a request to the persona export application 118. The persona export application 118 may identify the data for export and generate a persona export file 106. The user 102 may import the persona export file 106 into another instance of the persona management application 144. FIG. 1 includes various stages A through C that may illustrate the performance of actions and/or the movement of data between various components of the system 100. The system 100 may perform these stages in any order.

In more detail, the user 102 may be interacting with the computing device 104. The computing device 104 may include a persona management client 146 that allows the user 102 to interact with a computing instance of the persona management application 144. The server 116 may be configured to generate various instances of the persona management application 144. Each instance may include various personas. These personas may correspond to employees of a company, students at a school, members of a club, and/or any other group of individuals. Each computing instance may correspond to various subgroups. For example, a first instance of the persona management application 144 may include employees in New York. A second instance of the persona management application 144 may include employees in Los Angeles. When an employee moves from New York to Los Angeles, or vice versa, the employee's persona may be moved from one instance to the other. In some implementations, even when an employee moves from one location to another location, the employee's persona may be archived in the previous location. In this way, the persona may be reactivated if the employee returns to the previous location.

The user 102 may input a request to the persona management client 146 on the computing device 104 to export a persona. The user 102 may request a specific persona that is located on the instance of the persona management application 144 with which the user 102 is interacting. In stage A, the persona management client 146 may generate a persona export request 114. The persona export request 114 may include data identifying the persona to export. The persona management application 144 of the server 116 may receive the persona export request 114. The persona management application 144 may instruct the persona export application 118 to export the persona specified in the persona export request 114.

In stage B, the persona export application 118 may begin the process of exporting the persona. The persona may be associated with the persona data 142. The persona data 142 may be located on the instance of the persona management application 144. The persona export application 118 may include a data selector 148. The data selector 148 may be configured to analyze the persona data 142 and select, from the persona data 142, data to export in response to the persona export request 114.

The persona data 142 may include data that is located in different databases and modules. Similarly, persona data for other personas may be located in some of those same databases and modules and/or different databases and modules. The persona data 142 may include a persona virtual device 126. The persona virtual device 126 may be a virtual computing device that is located on a cloud instance 128. The user 102 may utilize the persona virtual device 126 in cases where the user 102 is accessing the persona.

The data selector 148 may determine whether to select the persona virtual device 126 for exporting. The data selector 148 may determine whether the persona virtual device 126 is part of the persona or part of the instance of the persona management application 144 where the persona is located. If the data selector 148 determines that the persona virtual device 126 is part of the persona, then the data selector 148 may select the persona virtual device 126 for export. If the data selector 148 determines that the persona virtual device 126 is part of the instance of the persona management application 144 where the persona is located, then the data selector 148 may bypass selecting the persona virtual device 126 for export.

In the example of FIG. 1, the data selector 148 may determine that the persona virtual device 126 is part of the instance of the persona management application 144 where the persona is located. The data selector 148 may make this determination based on several factors. First, the data selector 148 may determine that the persona virtual device 126 and the corresponding configuration of the persona virtual device 126 may be bound to the instance of the persona management application 144 where the persona is located. Second, and based on this determination, the data selector 148 may determine that the persona virtual device 126 is unable to be exported. The data selector 148 may also determine that the complexity of exporting a virtual device that is located on a cloud instance is greater than a threshold complexity. Based on these determinations, the data selector 148 may bypass selecting the persona virtual device 126 for export.

The persona data 142 may include elastic search logging records 134. The elastic search logging records 134 may include usage records related to how the user 102 and other users utilized the persona. The elastic search logging records 134 may include data identifying actions performed by the persona and actions associated with the persona. The elastic search logging records 134 may also include data related to the actions perform on, by, and associated with the persona virtual device 126 and the corresponding cloud instance 128.

The data selector 148 may determine whether to select the elastic search logging records 134. The data selector 148 may determine whether the elastic search logging records 134 are part of the persona or part of the instance of the persona management application 144 where the persona is located. If the data selector 148 determines that the elastic search logging records 134 are part of the persona, then the data selector 148 may select the elastic search logging records 134 for export. If the data selector 148 determines that the elastic search logging records 134 are part of the instance of the persona management application 144 where the persona is located, then the data selector 148 may bypass selecting the elastic search logging records 134 for export.

In the example of FIG. 1, the data selector 148 may determine that the elastic search logging records 134 are bound to information that is specific to the instance of the persona management application 144 where the persona is located. The data selector 148 may make this determination based on one or more factors. One of those factors may be that the data selector 148 may determine that at least a portion of the elastic search logging records 134 are bound to information such as the persona virtual device 126, primary keys on a database of the instance of the persona management application 144 where the persona is located, foreign keys on a database of the instance of the persona management application 144 where the persona is located, and/or additional information bound to information that is specific to the instance of the persona management application 144 where the persona is located. Based on this determination, the data selector 148 may determine that the elastic search logging records 134 are bound to information that is specific to the instance of the persona management application 144 where the persona is located. Accordingly, the data selector 148 may bypass selecting the persona virtual device 126 for export.

The persona data 142 may include unified communications as a service (UCaaS) related information 136. UCaaS-related information 136 may be related to unified communications as a service capabilities of the instance of the persona management application 144 and/or the persona virtual device 126. The unified communications as a service may allow the placement and receipt of communications such as voice, video, messages, and/or any other similar type of communication from the instance of the persona management application 144 and/or the persona virtual device 126. The data related to those communications and stored in the UCaaS-related information 136 may include data identifying the parties to the communication, a timestamp of the communication, the content of the communication, and/or any other similar information. In some implementations, the UCaaS-related information 136 may correspond to the instance of the persona management application 144 and/or the persona virtual device 126, either of which may be associated with multiple personas.

The data selector 148 may determine whether to select the UCaaS-related information 136. The data selector 148 may determine whether the UCaaS-related information 136 is part of the persona or part of the instance of the persona management application 144 where the persona is located. If the data selector 148 determines that the UCaaS-related information 136 are part of the persona, then the data selector 148 may select the UCaaS-related information 136 for export. If the data selector 148 determines that the UCaaS-related information 136 are part of the instance of the persona management application 144 where the persona is located, then the data selector 148 may bypass selecting the UCaaS-related information 136 for export.

In the example of FIG. 1, the data selector 148 may determine that the UCaaS-related information 136 is bound to the instance of the persona management application 144 where the persona is located. The data selector 148 may make this determination based on one or more factors. One of those factors may be that the data selector 148 may determine that an instance of the persona management application 144 may include multiple personas. Because of that, the data selector 148 may be unable to identify which portion of the UCaaS-related information 136 corresponds to one persona versus another. The data selector 148 may determine that the UCaaS-related information 136 is bound to the instance of the logging records 134 are bound to information that is specific to the instance of the persona management application 144 where the persona is located. Accordingly, the data selector 148 may bypass selecting the UCaaS-related information 136 for export.

The persona related data 142 may include the back-end database persona information 138. The back-end database persona information 138 may be located on a back-end database 140. The back-end database 140 may store back-end data for the persona management application 144. The back-end database 140 may include information that is part of the data input during the workflow to create each persona. The back-end database 140 may also include other details related to each persona such as the name, age, email, phone numbers, home address, business address, online activity, online accounts, and/or any other similar type of information.

The data selector 148 may determine whether to select the back-end database persona information 138. The data selector 148 may determine whether the back-end database persona information 138 is part of the persona or part of the instance of the persona management application 144 where the persona is located. If the data selector 148 determines that the back-end database persona information 138 is part of the persona, then the data selector 148 may select the back-end database persona information 138 for export. If the data selector 148 determines that the back-end database persona information 138 is part of the instance of the persona management application 144 where the persona is located, then the data selector 148 may bypass selecting the back-end database persona information 138 for export.

In the example of FIG. 1, the data selector 148 may determine that the back-end database persona information 138 is part of the persona and is not bound to the instance of the persona management application 144 where the persona is located. The data selector 148 may make this determination based on one or more factors. One of those factors may be determining that the back-end database persona information 138 specifies details for the persona without including details related to other personas. In this sense, the data selector 148 can separate the persona information in the back-end database 140 into data for different personas. The data selector 148 can separate the back-end database persona information 138 from persona data related to other personas stored in the back-end database. Accordingly, the data selector 148 may select the back-end database persona information 138 for export.

The persona related data 142 may include digital asset management system persona data 132. The digital asset management system persona data 132 may be located on the digital asset management system 130. The digital asset management system 130 may store data that belongs to different personas for the persona management application 144 in addition to other data. The digital asset management system persona data 132 may be related to the persona but may be different than the back-end database persona information 138. Any information that may be related to the persona that may not be information such as name, age, email, phone numbers, home address, business address, online activity, online accounts, and/or any other similar type of information may be stored in the digital asset management system persona data 132.

The data selector 148 may determine whether to select the digital asset management system persona data 132. The data selector 148 may determine whether the digital asset management system persona data 132 is part of the persona or part of the instance of the persona management application 144 where the persona is located. If the data selector 148 determines that the digital asset management system persona data 132 is part of the persona, then the data selector 148 may select the digital asset management system persona data 132 for export. If the data selector 148 determines that the digital asset management system persona data 132 is part of the instance of the persona management application 144 where the persona is located, then the data selector 148 may bypass selecting the digital asset management system persona data 132 for export.

In the example of FIG. 1, the data selector 148 may determine that the digital asset management system persona data 132 is part of the persona and is not bound to the instance of the persona management application 144 where the persona is located. The data selector 148 may make this determination based on one or more factors. One of those factors may be determining that the digital asset management system persona data 132 specifies details for the persona without including details related to other personas. In this sense, the data selector 148 can separate the persona information in the digital asset management system 130 into data for different personas. The data selector 148 can separate the digital asset management system persona data 132 from persona data related to other personas stored in the digital asset management system 130. Accordingly, the data selector 148 may select the digital asset management system persona data 132 for export.

With the back-end database persona information 138 and the digital asset management system persona data 132 selected for export, the persona export application 118 may instruct the metadata generator 122 to generate a metadata file 108 that that describes the data selected for export. The metadata generator 122 may be configured to generate a metadata file 108 that includes a timestamp that indicates the date and time exporting of the back-end database persona information 138 and the digital asset management system persona data 132. The metadata generator 122 may also include in the metadata file 108 a description of the data included in the back-end database persona information 138 and the digital asset management system persona data 132. For example, if the back-end database persona information 138 or the digital asset management system persona data 132 included a profile on a social media network, then the metadata file 108 may include data identifying the social media network, the date of the creation of the profile, the date of export of the profile, and/or any other similar information that may not be included in the profile itself.

In some implementations, the metadata file 108 may include data identifying the instance of the persona management application 144 where the persona was located, whether the persona was deleted from the instance of the persona management application 144 where the persona was located, whether the persona was archived from the instance of the persona management application 144 where the persona was located, the user requesting the exporting of the persona, the export and import history of the persona, and/or any other similar information. The export and import history of the persona may include the data from previous metafiles that were included in persona export files of this persona.

The persona export application 118 may instruct the file compressor 120 to process the back-end database persona information 138 and the digital asset management system persona data 132. The file compressor 120 may analyze the back-end database persona information 138 and the digital asset management system persona data 132 to determine an initial file format to capture each of the back-end database persona information 138 and the digital asset management system persona data 132. The file compressor 120 may analyze the digital asset management system persona data 132 and determine that the digital asset management system persona data 132 is larger than a threshold size and binary. Based on these factors, the file compressor 120 may convert the digital asset management system persona data 132 into a digital asset management system persona file 112 with a data interchange format. For example, the file compressor 120 may select the JavaScript object notation (JSON) format for the digital asset management system persona file 112. The digital asset management system persona file 112 may include all or almost all of the relevant data included in the digital asset management system persona data 132. Other formats may include binary javascript object notation (BSON), extensible markup language (XML), and any other similar data interchange format.

The file compressor 120 may analyze the back-end database persona information 138. The file compressor 120 may determine that the back-end database persona information 138 is larger than a threshold size and binary. Based on these factors, the file compressor 120 may convert the back-end database persona information 138 into a back-end database persona file 110 with a data interchange format. The back-end database persona file 110 may include all or almost all of the relevant data included in the back-end database persona information 138. For example, the file compressor 120 may select the JavaScript object notation (JSON) format. Other formats may include binary javascript object notation (BSON), extensible markup language (XML), and any other similar data interchange format. In some implementations, the file compressor 120 may select the same format for the back-end database persona file 110 as the digital asset management system persona file 112.

The file compressor 120 may combine the metadata file 108, the back-end database persona file 110, and the digital asset management system persona file 112 and compress the files into a single persona export file 106. The file compressor 120 may select from various compressed file formats for the persona export file 106. The various compress file formats may use lossless compression schemes. For example, the file compressor 120 may use the ZIP file format. Other compressed file formats may include java archive (JAR) and other similar formats.

The persona export application 118 may instruct the file encryptor 124 to encrypt the persona export file 106. The file encryptor 124 may select from various encryption schemes. In some implementations, the file encryptor 124 may encrypt the persona export file 106 using a public key of a public-private key pair. In some implementations, the file encryptor 124 may request a password and/or other type of key from the user 102. The file encryptor 124 may encrypt the persona export file 106 using the provided password or key.

In stage C, the persona export application 118 may provide the persona export file 106 to the computing device 104. With the creation of the persona export file 106, the details related to the persona are outside of the instance of the persona management application 144 where the persona was previously located. The user 102 may be able to create a new instance of the persona management application 144 and load the persona export file 106 into that new instance of the persona management application 144.

Figure 2:
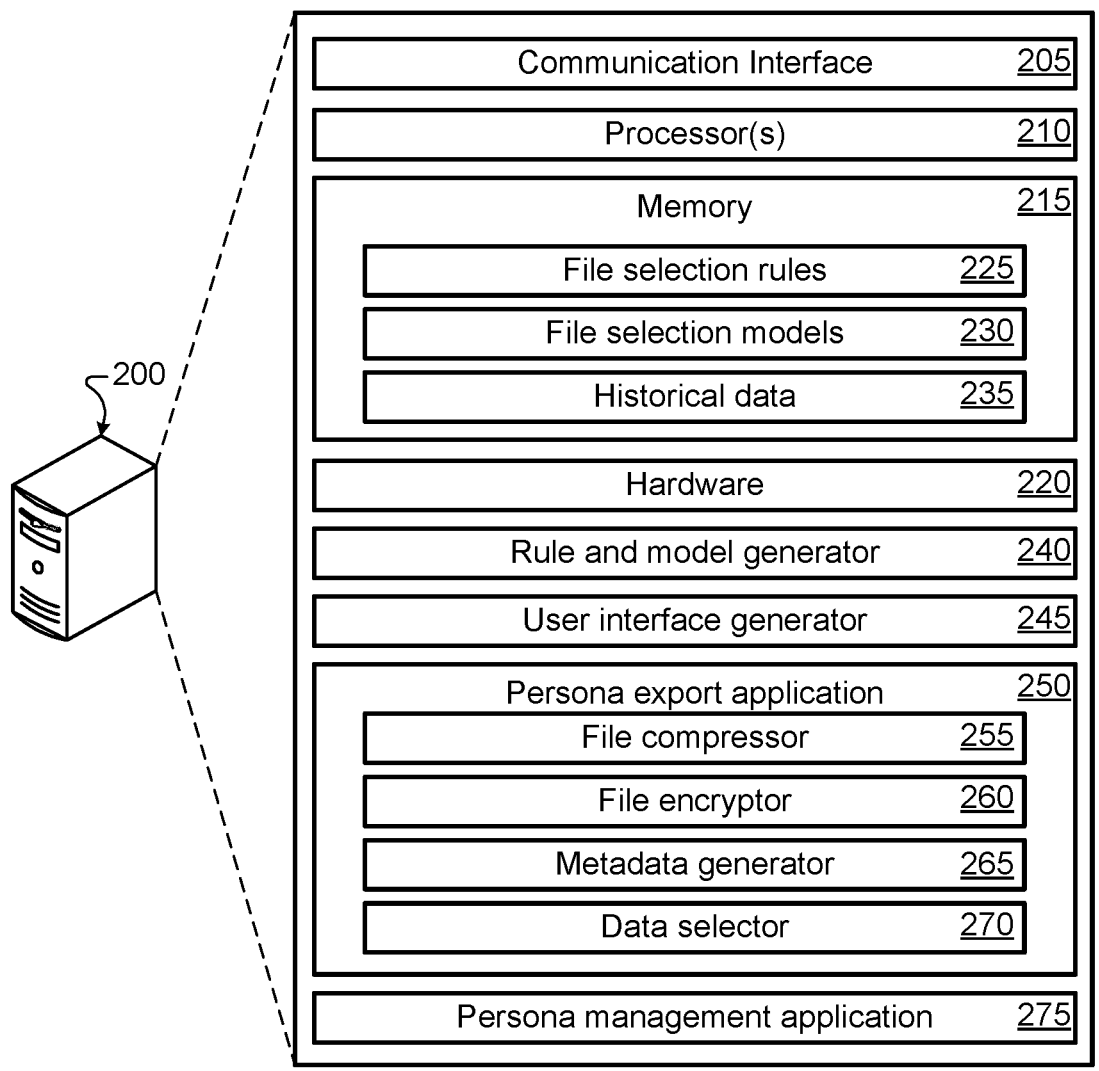
FIG. 2 illustrates an example server that is configured to export a persona.

FIG. 2 illustrates an example server 200 that is configured to export a persona. The server 200 may be any type of computing device that is configured to communicate with other computing devices. The server 200 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The server 200 may be similar to the server 116 of FIG. 1 or any other type of computing device that is capable of performing similar actions. Some of the components of the device may be implemented in a single computing device or distributed over multiple computing devices. Some of the components may be in the form of virtual machines or software containers that are hosted in a cloud in communication with disaggregated storage devices.

The server 200 may include a communication interface 205, one or more processors 210, memory 215, and hardware 220. The communication interface 205 may include communication components that enable the server 200 to transmit data and receive data from other devices and networks. In some implementations, the communication interface 205 may be configured to communicate over a wide area network, a local area network, the internet, a wired connection, a wireless connection, and/or any other type of network or connection. The wireless connections may include Wi-Fi, short-range radio, infrared, and/or any other wireless connection.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a persona management application 275 by executing software stored in the memory 215. The persona management application 275 may be similar to the persona management application 144 of FIG. 1. Various instances of the persona management application 275 may include different personas. A user may interact with the different personas. In some cases, the user may wish to move a persona from one instance of the persona management application 275 to another instance of the persona management application 275.

The one or more processors 210 may implement a persona export application 250 by executing software stored in the memory 215. The persona export application 250 may be similar to the persona export application 118 of FIG. 1. The persona export application 250 may be configured to export a persona from an instance of the persona management application 275 into a persona export file. Another instance of the persona management application 275 may import the persona export file, effectively moving the person from one instance of the persona management application 275 to another instance of the persona management application 275.

The persona export application 250 may include a data selector 270 that may be similar to the data selector 148 of FIG. 1. The data selector 270 may be configured to select the persona data for export. The persona export application 250 may include a metadata generator 265 that may be similar to the metadata generator 122 of FIG. 1. The metadata generator 265 may be configured to generate metadata related to the exported persona and the persona data selected for export. The persona export application 250 may include a file compressor 255 that may be similar to the file compressor 120 of FIG. 1. The file compressor 255 may be configured to convert the selected persona data into one or more files in a data interchange format. The file compressor 255 may compress the data interchange files and/or the metadata file into an archive file. The persona export application 250 may include a file encryptor 260 that may be similar to the file encryptor 124 of FIG. 1. The file encryptor 260 may be configured to encrypt the archive file generated by the file compressor 255. The persona export application 250 may be configured to output the encrypted and compressed persona export file.

The one or more processors 210 may implement a user interface generator 245 by executing software stored in the memory 215. The user interface generator 245 may interact with the persona export application 250 to assist the user who is exporting the persona. Upon selection of a persona by the user, the user interface generator 245 may generate a visualization for the selected persona. The visualization may include an export persona option. Upon the user selecting the export persona option, the user interface generator 245 may generate a visualization of a request for additional information and/or a visualization of expected details of the persona export file. The expected details may include an expected size of the persona export file. The request for additional information may include a request for a password to encrypt the persona export file.

Upon selection of an option to confirm export of the persona, the persona export application 250 may call an endpoint on a back-end of the persona management application 144. This call may trigger an asynchronous task that results in the generation of the persona export file. When the persona export file is ready, the user interface generator 245 may generate a notification for the user and provide a link to the persona export file.

The user interface generator 245 may assist in the importing of the persona export file. Upon initialization of the persona creation workflow, the user interface generator 245 may generate a button that, upon selection by the user, allows the user to import a persona. Upon selection of the button, the user indicates to location of the persona export file. After selection of the file, the persona management application 144 may call an endpoint on a front end of the persona management application 144. This may trigger an asynchronous task that results in the importing of the persona export file into the persona management application 144. When the importing is complete, the user interface generator 245 may generate a notification to the user. The notification may indicate successful importing of the persona or indicate any issues that occurred during the importing process.

In some implementations, the user interface generator 245 may generate a user interface that is configured to receive user input to provide to the data selector 270. This user interface may include options to select the persona virtual device of the persona selected for export, the elastic search logging records, the UCaaS-related information, the digital asset management system persona data, and/or the back-end database persona information for inclusion in the persona export file. If the user selects or does not select one of these data sources, then that selection may override the determinations of the data selector 270. In some implementations, the metadata file may indicate whether the decision to include or exclude data was made by a user or the data selector 270 and the identity of the user.

The one or more processors 210 may implement a rule and model generator 240 by executing software stored in the memory 215. The rule and model generator 240 may generate the file selection rules 225 and the file selection models 230 using the historical data 235. The data selector 270 may use the file selection rules 225 and the file selection models 230 to select data for inclusion in the persona export file. The file selection rules 225 may specify various conditions, ranges, thresholds, and/or any other similar evaluation technique to determine whether to include any data associated with the persona in the persona export file. The file selection models 230 may receive the data associated with the persona and output data identifying what portion of the data to select for inclusion in the persona export file.

The historical data 235 may include data related to personas that have been exported and imported and the corresponding persona export files. The historical data 235 may include data for each persona in three phases. The first phase may be the data from the original instance of the persona management application 275 where the persona was created and exported. The second phase may be the persona export file. The third phase may be data from the instance of the persona management application 275 where the persona was imported. The first phase may after performing any actions related to the persona and before exporting. The third phase may be before performing any actions related to the persona and after importing.

The rule and model generator 240 may analyze the historical data 235 and generate the file selection rules 225. The rule and model generator 240 may generate the file selection rules 225 may comparing the first phase persona data of the various personas to the third phase persona data of the various personas. The rule and model generator 240 may determine whether there is any persona data missing between the third phases and the first phases for the various personas. Based on these comparisons, the rule and model generator 240 may determine for which persona the third and the first phases match the closest. In this case, the rule and model generator 240 may specify to select the data included in the persona export files for the persons where the third and the first phases match the closest.

In some implementations, the file selection rules 225 may be specified by a user. In some implementations, the rule and model generator 240 may receive restrictions and/or limitations that may relate to the size of the persona export files, a threshold for the persona data to match between the third and first phases, and/or any other similar restriction. For example, a user may specify that the persona export files should be less than a threshold size. In this case, the rule and model generator 240 may identify the persona export files that are less than that threshold size and generate the file selection rules 225 based on the data included in those persona export files and the comparison between the corresponding first and third phases for those personas. The threshold for the persona data to match between the third and first phases may indicate that, for example, a ninety percent match is sufficient for successful exporting and importing. In this case, the file selection rules 225 may specify the data to include in the persona export files that matches to the data included in the personas with at least a ninety percent match between the third and first phases.

The rule and model generator 240 may use the historical data 235 and machine learning to generate the file selection models 230. The file selection models 230 may be configured to receive persona data and output data identifying what portion of the persona data to include in the persona export file. The rule and model generator 240 may generate data samples that each correspond to a persona and that each include the persona data at the first phase, the persona data at the third phase, and the persona export file. The rule and model generator 240 may train the file selection models 230 using machine learning and the data samples. The resulting file selection models 230 may be configured to receive data identifying a persona for export and the data associated with the persona. The file selection models 230 may output data indicating what portion of the persona data to include in the persona export file.

In some implementations, the rule and model generator 240 may continuously update the file selection rules 225 and the file selection models 230 as the historical data 235 is updated. The rule and model generator 240 may retrain the file selection models 230 using the updated historical data. The rule and model generator 240 may update the file selection rules 225 by comparing the first phase persona data of the new personas to the third phase persona data of the new personas.

Figure 3:
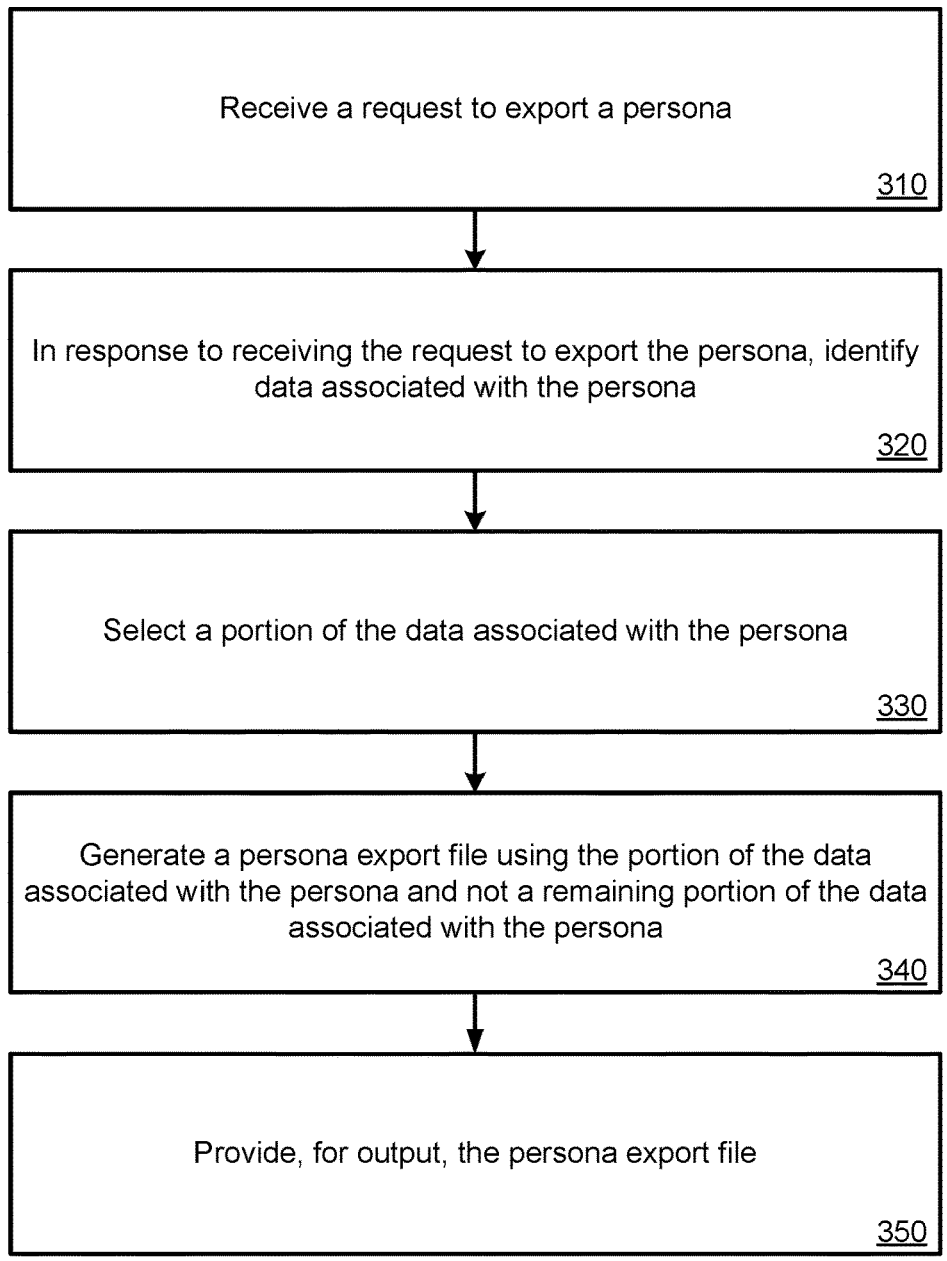
FIG. 3 is a flowchart of an example process for exporting a persona.

FIG. 3 is a flowchart of an example process 300 for exporting a persona. In general, the process 300 receives a request to export a persona. The process 300 identifies the data related to the persona and select a portion of that data for export. The process 300 generates a file for export using the selecting portion of the data related to the persona. The process 300 will be described as being performed by the server 116 of FIG. 1 and will include references to other components in FIG. 1. The process 300 may also be performed by the server 200 of FIG. 2. In some implementations, the process 300 may be performed by one or more computing devices, including virtual computing devices.

The server 116 receives a request to export a persona (310). The server 116 may receive the request from a user 102 who is interacting with the computing device 104. The user 102 may be attempting to move the persona from one instance of the persona management application 144 to another instance of the persona management application 144.

In response to receiving the request to export the persona, the server 116 identifies data associated with the persona (320). The server 116 may analyze the instance of the persona management application 144 where the persona is located to identify the data associated with the persona. The server 116 may identify a persona virtual device 126. The persona virtual device may comprise a virtual machine that allows the user 102 to access the persona. The server 116 may identify elastic search logging records 134 and UCaaS-related information 136 as data associated with the persona. The server 116 may identify digital asset management system persona data 132 and back-end database persona information 138. The digital asset management system persona data 132 may be located on a digital asset management system 130. The back-end database persona information 138 may be located on a back-end database 140 of a cloud computing instance where the persona is located.

The server 116 selects a portion of the data associated with the persona (330). The server 116 may determine which of the data associated with the persona should be exported in response to the export request. The server 116 may determine whether the data is bound to an instance of the persona management application 144 where the persona is located. If the data is bound to the instance of the persona management application 144 where the persona is located, then the server 116 may bypass selecting the data for export. If the data is not bound to the instance of the persona management application 144 where the persona is located, then the server 116 may select the data for export.

The server 116 may determine that the persona virtual device 126, the elastic search logging records 134, and the UCaaS-related information 136 are bound to the instance of the persona management application 144 where the persona is located. The server 116 may determine that the digital asset management system persona data 132 and the back-end database persona information 138 are not bound to the instance of the persona management application 144 where the persona is located.

The server 116 generates a persona export file 106 using the portion of the data associated with the persona and not a remaining portion of the data associated with the persona (340). The portion of the data associated with the persona may include the digital asset management system persona data 132 and the back-end database persona information 138 because that data is not bound to the instance of the persona management application 144 where the persona is located. The remaining portion of the data associated with the persona may include the persona virtual device 126, the elastic search logging records 134, and the UCaaS-related information 136 because that data is bound to the instance of the persona management application 144 where the persona is located.

In some implementations, the server 116 may generate a metadata file 108 that includes data identifying the content of the portion of the data associated with the persona. The server 116 may include the metadata file 108 in the persona export file 106. The server 116 may generate, using the back-end database persona information 138, a back-end database persona file 110 using a data interchange format. The server 116 may generate, using the digital asset management system persona data 132, a digital asset management system persona file 112 using the data interchange format. The server 116 may include the back-end database persona file 110 and the digital asset management system persona file 112 in the persona export file 106. The server 116 may compress, archive, and encrypt the persona export file 106.

The server 116 provides, for output, the persona export file 106 (350). The persona export file 106 may be configured to be located onto a different cloud computing instance than where the persona was located.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
   receiving, by an instance of a persona management application that is running on a computing device and from a first user, a request to export a persona that represents a second user and that is located on the instance of the persona management application;
   in response to receiving the request to export the persona, identifying, by the instance of the persona management application that is running on the computing device, data associated with the persona;
   determining, by the instance of the persona management application that is running on the computing device, whether a portion of the data associated with the persona is bound to information that is specific to the instance of the persona management application;
   based on determining whether the portion of the data associated with the persona is bound to information that is specific to the instance of the persona management application, determining, by the instance of the persona management application that is running on the computing device, whether to export the portion of the data associated with the persona;
   generating, by the instance of the persona management application that is running on the computing device, a persona export file using the portion of the data associated with the persona or another portion of the data associated with the persona; and
   providing, for output by the instance of the instance of persona management application that is running on the computing device, the persona export file.

2. The method of claim 1, wherein:
   identifying the data associated with the persona includes identifying a persona virtual device that comprises a virtual machine that allows the first user to access the persona,
   the portion of the data associated with the persona includes the persona virtual device, and
   determining whether to export the portion of the data associated with the persona comprises determining not to export the persona virtual device.

3. The method of claim 1, wherein:
   identifying the data associated with the persona includes identifying elastic search logging records that are associated with the persona,
   the portion of the data associated with the persona includes the elastic search logging records, and
   determining whether to export the portion of the data associated with the persona comprises determining not to export the elastic search logging records.

4. The method of claim 1, wherein:
identifying the data associated with the persona includes identifying unified communications as a service (UCaaS) related information that is associated with the persona,
the portion of the data associated with the persona includes the UCaaS-related information, and
determining whether to export the portion of the data associated with the persona comprises determining not to export the UCaaS-related information.

5. The method of claim 1, wherein:
the persona is located on a first cloud computing instance, and
the persona export file is configured to be loaded onto a second, different cloud computing instance.

6. The method of claim 1, wherein:
identifying the data associated with the persona includes identifying data available on a digital asset management service that is associated with the persona,
the portion of the data associated with the persona includes the data available on the digital asset management service that is associated with the persona, and
determining whether to export the portion of the data associated with the persona comprises determining to export the data available on the digital asset management service that is associated with the persona.

7. The method of claim 6, wherein generating the persona export file using the portion of the data associated with the persona or the other portion of the data associated with the persona comprises:
generating, using the data available on the digital asset management service that is associated with the persona, a digital asset management persona file in a data interchange format; and
including the digital asset management persona file in the persona export file.

8. The method of claim 1, wherein:
identifying the data associated with the persona includes identifying data that is located on a back-end database of a first cloud computing instance where the persona is located,
the portion of the data associated with the persona includes the data that is located on the back-end database of the first cloud computing instance where the persona is located, and
determining whether to export the portion of the data associated with the persona comprises determining to export the data that is located on the back-end database of the first cloud computing instance where the persona is located.

9. The method of claim 8, wherein generating the persona export file using the portion of the data associated with the persona or the other portion of the data associated with the persona comprises:
generating, using the data that is located on the back-end database of the first cloud computing instance where the persona is located, a back-end database persona file in the data interchange format; and
including the back-end database persona file in the persona export file.

10. The method of claim 1, wherein generating the persona export file using the portion of the data associated with the persona or the other portion of the data associated with the persona comprises:
generating a metadata file that includes data identifying content of the portion of the data associated with the persona; and
including the metadata file in the persona export file.

11. A system, comprising:
one or more processors; and
memory including a plurality of computer-executable components that are executable by the one or more processors to perform a plurality of actions, the plurality of acts comprising:
receiving, by an instance of a persona management application that is running on the system and from a first user, a request to export a persona that represents a second user and that is located on the instance of the persona management application;
in response to receiving the request to export the persona, identifying, by the instance of the persona management application that is running on the system, data associated with the persona;
determining, by the instance of the persona management application that is running on the system, whether a portion of the data associated with the persona is bound to information that is specific to the instance of the persona management application;
based on determining whether the portion of the data associated with the persona is bound to information that is specific to the instance of the persona management application, determining, by the instance of the persona management application that is running on the computing device, whether to export the portion of the data associated with the persona;
generating, by the instance of the persona management application that is running on the computing device, a persona export file using the portion of the data associated with the persona or another portion of the data associated with the persona; and
providing, for output by the instance of the persona management application that is running on the system, the persona export file.

12. The system of claim 11, wherein:
identifying the data associated with the persona includes identifying a persona virtual device that comprises a virtual machine that allows the first user to access the persona,
the portion of the data associated with the persona includes the persona virtual device, and
determining whether to export the portion of the data associated with the persona comprises determining not to export the persona virtual device.

13. The system of claim 11, wherein:
identifying the data associated with the persona includes identifying elastic search logging records and unified communications as a service (UCaaS) related information that are associated with the persona,
the portion of the data associated with the persona includes the elastic search logging records and the UCaaS-related information, and
determining whether to export the portion of the data associated with the persona comprises determining not to export the elastic search logging records and the UCaaS-related information.

14. The system of claim 11, wherein:
the persona is located on a first cloud computing instance, and
the persona export file is configured to be loaded onto a second, different cloud computing instance.

15. The system of claim 11, wherein:
identifying the data associated with the persona includes identifying data available on a digital asset management service that is associated with the persona, the portion of the data associated with the persona includes the data available on the digital asset management service that is associated with the persona, and determining whether to export the portion of the data associated with the persona comprises determining to export the data available on the digital asset management service that is associated with the persona.

16. The system of claim 15, wherein generating the persona export file using the portion of the data associated with the persona or the other portion of the data associated with the persona comprises:

generating, using the data available on the digital asset management service that is associated with the persona, a digital asset management persona file in a data interchange format; and including the digital asset management persona file in the persona export file.

17. The system of claim 11, wherein:

identifying the data associated with the persona includes identifying data that is located on a back-end database of a first cloud computing instance where the persona is located, the portion of the data associated with the persona includes the data that is located on the back-end database of the first cloud computing instance where the persona is located, and determining whether to export the portion of the data associated with the persona comprises determining to export the data that is located on the back-end database of the first cloud computing instance where the persona is located.

18. The system of claim 17, wherein generating the persona export file using the portion of the data associated with the persona or the other portion of the data associated with the persona comprises:

generating, using the data that is located on the back-end database of the first cloud computing instance where the persona is located, a back-end database persona file in the data interchange format; and including the back-end database persona file in the persona export file.

19. The system of claim 11, wherein generating the persona export file using the portion of the data associated with the persona or the other portion of the data associated with the persona comprises:

generating a metadata file that includes data identifying content of the portion of the data associated with the persona; and including the metadata file in the persona export file.

20. One or more non-transitory computer-readable media storing computer-executable instructions that upon execution cause one or more computers to perform acts comprising:

receiving, by an instance of a persona management application that is running on the one or more computers and from a first user, a request to export a persona that represents a second user and that is located on the instance of the persona management application;

in response to receiving the request to export the persona, identifying, by the instance of the persona management application that is running on the one or more computers, data associated with the persona;

based on determining whether the portion of the data associated with the persona is bound to information that is specific to the instance of the persona management application, determining, by the instance of the persona management application that is running on the computing device, whether to export the portion of the data associated with the persona;

generating, by the instance of the persona management application that is running on the computing device, a persona export file using the portion of the data associated with the persona or another portion of the data associated with the persona; and providing, for output by the instance of the persona management application that is running on the one or more computers, the persona export file.

* * * * *